US009008362B1

(12) United States Patent
Friesel

(10) Patent No.: US 9,008,362 B1
(45) Date of Patent: Apr. 14, 2015

(54) CORRELATION OF 3-D POINT IMAGES

(71) Applicant: Lockheed Martin Corporation, Bethesda, MD (US)

(72) Inventor: Mark A. Friesel, Ewing, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 189 days.

(21) Appl. No.: 13/648,767

(22) Filed: Oct. 10, 2012

(51) Int. Cl.
*G06K 9/00* (2006.01)
(52) U.S. Cl.
CPC .................................... *G06K 9/0063* (2013.01)
(58) Field of Classification Search
None
See application file for complete search history.

(56) References Cited

U.S. PATENT DOCUMENTS

| 7,738,008 | B1 * | 6/2010 | Ball | 348/159 |
|---|---|---|---|---|
| 2004/0002642 | A1 * | 1/2004 | Dekel et al. | 600/407 |
| 2005/0213818 | A1 * | 9/2005 | Suzuki et al. | 382/190 |
| 2007/0279494 | A1 * | 12/2007 | Aman et al. | 348/169 |
| 2008/0123900 | A1 * | 5/2008 | Ma et al. | 382/103 |

* cited by examiner

*Primary Examiner* — Avinash J Yentrapati
(74) *Attorney, Agent, or Firm* — Howard IP Law Group, PC

(57) ABSTRACT

A method and system is disclosed for tracking object clusters. The method comprises obtaining a first sensor image and a second sensor image. Angular measurements between objects of the first sensor image are determined. Angular measurements between objects of the second sensor image are also determined. Angular measurements from the first sensor image are compared to angular measurements of the second image, and correlated object clusters are identified. The sensor system includes a command and decision unit that receives a first sensor image and a second sensor image. The command and decision unit determines angular measurements for the first sensor image, and determines angular measurements for the second sensor image. The command and decision unit compares the angular measurements for the first sensor image to the angular measurements for the second sensor image, and identifies correlated object clusters based on the comparison.

17 Claims, 5 Drawing Sheets

CORRELATION OF 3-D POINT IMAGES

FIELD OF THE INVENTION

The invention relates to systems and methods for sensor tracking of objects, and more particularly to a system and method for correlating three dimensional points images across independent sensors.

BACKGROUND OF THE INVENTION

Naval sensor systems often search space and track objects across independent sensors. If a cluster of objects is identified on a first sensor, when another cluster of objects is identified on a second sensor, there is a need to determine whether that cluster of objects on the second sensor is the same as the cluster of objects identified on the first sensor. In that way, the total number of threats can be accurately assessed and tracked.

In general, current methods are known for three-dimensional tracking of clusters of objects across different sensors. However, the known methods can be slow to implement because they require extensive calculation including isotropic scaling and conformal transformations such as Euclidean transformations. Thus, there is a need for a computationally simple technique for tracking clusters across independent sensors.

SUMMARY OF THE INVENTION

Naval search sensors often spot clusters of objects on different sensors. Cluster identification using isotropic scaling and conformal transformations has been avoided because of computational complexity as well as transformation error and bias. The disclosed method reduces the complexity of identifying clusters by comparing the clusters without coordinate transformation, which greatly simplifies the problem and allows a simple and easily calculated solution.

A method for tracking object clusters may comprise: obtaining a first sensor image having a plurality of first sensor image objects; obtaining a second sensor image having a plurality of second sensor image objects; determining first sensor image angular measurements for the plurality of first sensor image objects; determining second sensor image angular measurements for the plurality of second sensor image objects; identifying correlated object clusters by comparing the first sensor image angular measurements to the second sensor image angular measurements. Determining first sensor image angular measurements may comprise determining first sensor image tetrahedron angular measurements, and determining second sensor image angular measurements comprises determining second sensor image tetrahedron angular measurements. Determining first sensor image tetrahedron angular measurements may comprise determining a plurality of first sensor image tetrahedron internal angles for each first sensor image tetrahedron and determining second sensor image tetrahedron angular measurements may comprise determining a plurality of second sensor image tetrahedron internal angles for each second sensor image tetrahedron. In an embodiment, determining the plurality of first sensor image tetrahedron internal angles may comprise determining five first sensor image tetrahedron internal angles and wherein determining the plurality of second sensor image tetrahedron internal angles comprises determining five second sensor image tetrahedron internal angles.

The method for tracking object clusters may further comprise performing a chirality check when determining the plurality of first sensor image tetrahedron internal angles and the plurality of second sensor image tetrahedron internal angles. In an embodiment the method may also further comprise creating a first list containing the first sensor image tetrahedron angular measurements for first sensor image tetrahedrons. The method may also comprise creating a second list containing second sensor image tetrahedron angular measurements for the second sensor image tetrahedrons. Comparing the first sensor image angular measurements to the second sensor image angular measurements may comprise comparing the first sensor image tetrahedron angular measurements in the first list to the second sensor image tetrahedron angular measurements in the second list. In an embodiment, the first sensor image tetrahedrons and the second sensor image tetrahedrons having matching first sensor image tetrahedron angular measurements and second sensor image tetrahedron angular measurements are identified as correlated object clusters.

In an embodiment, comparing first sensor image tetrahedron angular measurements in the first list to second sensor image tetrahedron angular measurements in the second list comprises: selecting a selected first sensor image tetrahedron from the first list and selecting a selected first sensor image tetrahedron angular measurement of the selected first sensor image tetrahedron; comparing the selected first sensor image tetrahedron angular measurement to the second sensor image angular measurements in the second list; identifying second sensor image candidate tetrahedrons in the second list having a second sensor image tetrahedron angular measurement that matches the selected first sensor image tetrahedron angular measurement; selecting selected first sensor image tetrahedron adjacent angular measurements; comparing selected first sensor image tetrahedron adjacent angular measurements to the second sensor image angular measurements of the second sensor image candidate tetrahedrons; and designating second sensor image candidate tetrahedrons having second sensor image angular measurements matching the selected first sensor image tetrahedron adjacent angular measurements as correlated object clusters.

In an embodiment, a method for tracking object clusters may comprise: obtaining a first sensor image having a plurality of first sensor image objects; obtaining a second sensor image having a plurality of second sensor image objects; determining first sensor image tetrahedron angular measurements for first sensor image tetrahedrons; determining second sensor image tetrahedron angular measurements for second sensor image tetrahedrons; and identifying correlated object clusters by comparing the first sensor image tetrahedron angular measurements to the second sensor image tetrahedron angular measurements. Determining first sensor image tetrahedron angular measurements may comprise determining a plurality of first sensor image tetrahedron internal angles for each first sensor image tetrahedron and wherein determining second sensor image tetrahedron angular measurements comprises determining a plurality of second sensor image tetrahedron internal angles for each second sensor image tetrahedron. Determining the plurality of first sensor image tetrahedron internal angles may comprise determining five first sensor image tetrahedron internal angles and wherein determining the plurality of second sensor image tetrahedron internal angles comprises determining five second sensor image tetrahedron internal angles.

In an embodiment, the method for tracking object clusters may further comprise performing a chirality check when determining the plurality of first sensor image tetrahedron internal angles and the plurality of second sensor image tetrahedron internal angles. In an embodiment, comparing the first sensor image tetrahedron angular measurements to the second sensor image tetrahedron angular measurements may comprise: selecting a selected first sensor image tetrahedron and selecting a selected first sensor image tetrahedron angular measurement of the selected first sensor image tetrahedron; comparing the selected first sensor image tetrahedron angular measurement to the second sensor image tetrahedron angular measurements; identifying second sensor image candidate tetrahedrons having a second sensor image tetrahedron angular measurement that matches the selected first sensor image tetrahedron angular measurement; comparing selected first sensor image tetrahedron adjacent angular measurements to the second sensor image tetrahedron angular measurements of the second sensor image candidate tetrahedrons; and designating second sensor image candidate tetrahedrons having second sensor image tetrahedron angular measurements matching the selected first sensor image tetrahedron adjacent angular measurements as correlated object clusters.

A sensor system for tracking object clusters may comprise: a command and decision unit for: obtaining a first sensor image having a plurality of first sensor image objects; obtaining a second sensor image having a plurality of second sensor image objects; determining first sensor image tetrahedron angular measurements for first sensor image tetrahedrons defined by the plurality of first sensor image objects; determining second sensor image tetrahedron angular measurements for second sensor image tetrahedrons; and identifying correlated object clusters by comparing the first sensor image tetrahedron angular measurements to the second sensor image tetrahedron angular measurements. In an embodiment the system may further comprise a communications unit, and wherein obtaining the second sensor image comprises receiving the second sensor image from the communications unit.

BRIEF DESCRIPTION OF THE DRAWINGS

The details of the invention, both as to its structure and operation, may be obtained by a review of the accompanying drawings, in which like reference numerals refer to like parts, and in which.

DETAILED DESCRIPTION

Figure 1:
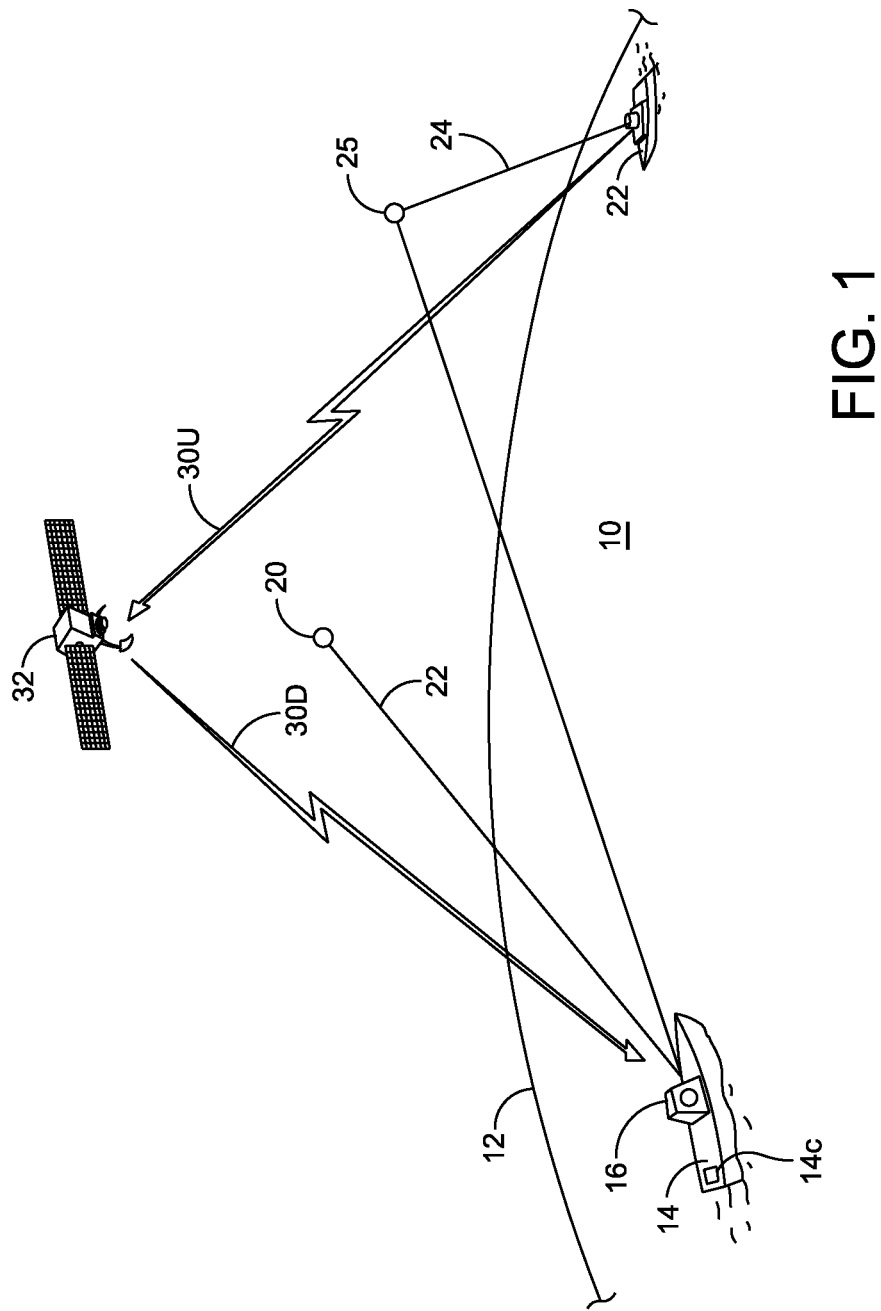
FIG. 1 is a representation of sensor system-equipped ships acquiring sensor images of clusters.

FIG. 1 shows a first ship 14 carrying a radar system 16 or other sensor system, and a computer processor 14c. As will be understood, radar system 16 may be any type of system capable of capturing images of object clusters, such as a radar system, an electro-optic infrared sensor system, or other three-dimensional spatial sensor systems. A cluster of objects 20 is located by the first ship 14 along a line-of-sight 22 by a sensor, and a sensor image of the first cluster is recorded into memory (not shown) by computer processor 14c. A second ship 22 also includes a sensor system (not shown), which may be a radar or other system, and a computer processor (not shown). A cluster of objects 25 is located by the second ship 22 along a line-of-sight 24 by a sensor, and a sensor image of the second cluster is recorded by second ship 22 and is recorded to memory by a computer processor on the second ship 22. FIG. 1 shows clusters 20 and 25 at different locations, which may be the case if the first ship and second ship see the same cluster at different points in time or if the clusters are different clusters. If the first and second ship see the same cluster at the same point in time, the cluster may be represented by a single cluster.

Figure 2:
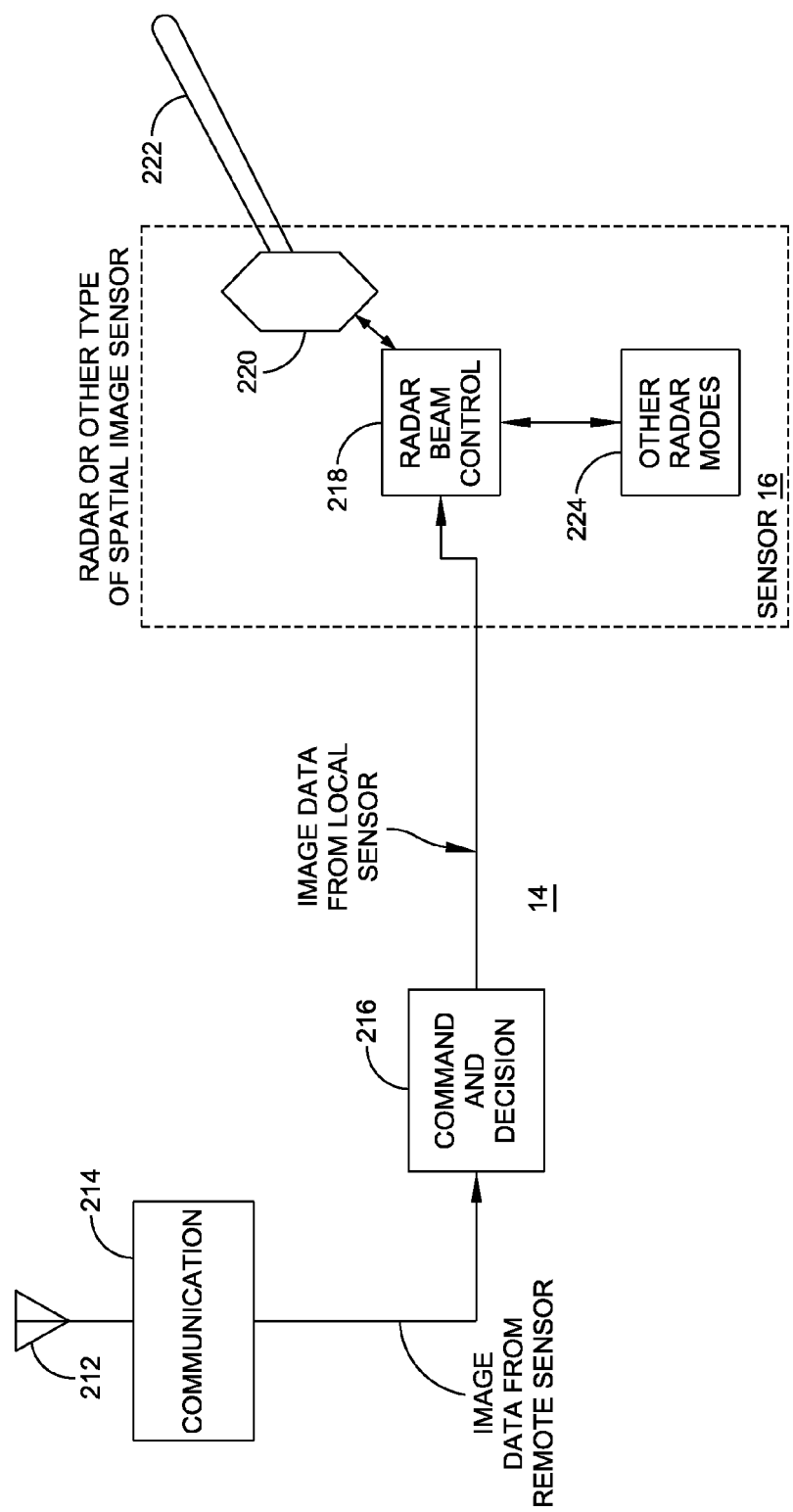
FIG. 2 is a simplified block diagram illustrating various shipboard functions relating to sensor acquisition of images of FIG. 1.

In FIG. 2, a first ship 14 includes a communications antenna 212 and communications unit 214 for communicating with other assets, including the communication represented in FIG. 1 by path 30D. This communication may include a radar image of cluster 25 observed by the radar of second ship 22. The communications unit 214 is coupled to a command and decision (C&D) unit 216. C&D unit 216 of the first ship 14 digitally processes radar images from the first ship and also from the second ship 22 in processor 14c, and from this processing determines whether the cluster of objects on the first ship's radar image contains some of the same objects as the cluster of objects on the second ship's radar image. Alternatively, second ship 22 may include the same equipment as the first ship, and may process a radar image it receives from the first ship as well as its own radar images. The embodiment of FIG. 2 includes a radar system, however as noted herein, in other embodiments other types of sensor systems may be used with the invention.

The first ship 14 of FIG. 2 also includes coupling between the C&D unit 216 and the first ship's radar beam control unit 218, which may also be part of computer 14c. Radar beam control unit 218 commands the generation of transmit and receive beams by antenna face 220. These beams are "pencil beams," or narrow beams, as are known in the art. A representative pencil beam is illustrated as 222. The radar beam controller 218 of FIG. 2, together with the antenna face 220, produces sequential pencil beams in directions which, in conjunction with other pencil beams, search the sky for objects. A radar image of a cluster of objects is made through use of the radar system.

Figure 3:
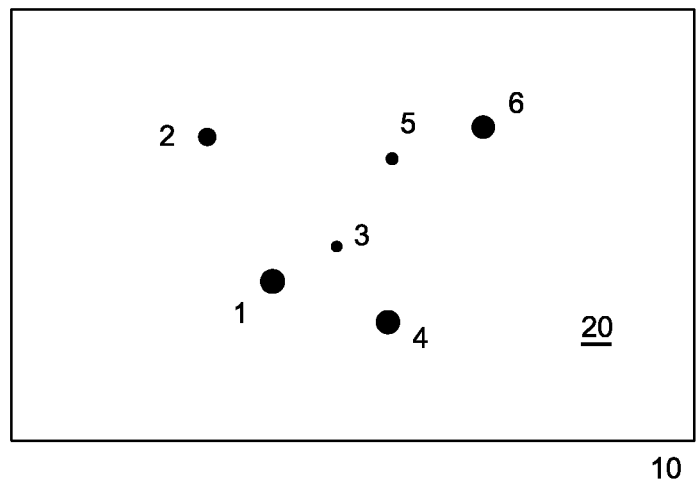
FIG. 3 is a representation of a sensor image having a plurality of objects.

FIG. 3 shows a three-dimensional sensor image 10 having a plurality of objects 20 numbered 1 through 6. The image may be captured by a radar or other type of sensor. Measurement of an object on the sensor image yields a position vector or equivalent (although the method is also applicable to velocity and other differences). If there is notable uncertainty, the position of the sensor image may be given by nominal position.

Figure 4:
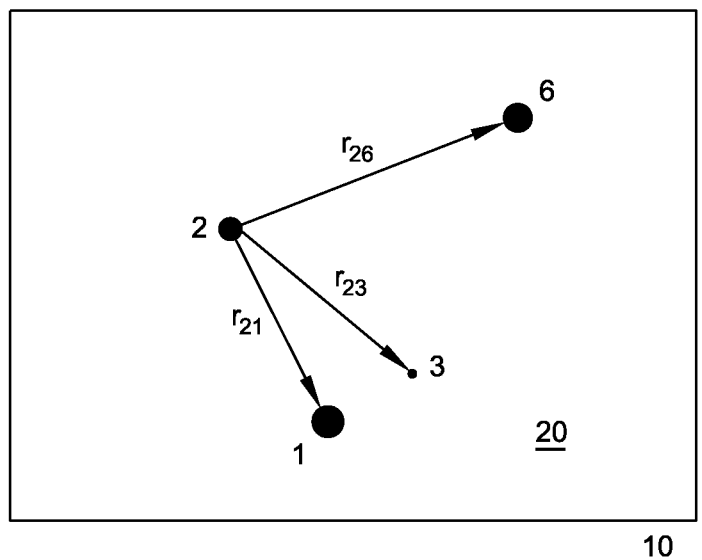
FIG. 4 is a representation of an angular measurement of a tetrahedron on a sensor image.

FIG. 4 shows a tetrahedron defined from points (objects) 20 on a sensor image 10. Specifically, FIG. 4 shows objects 1, 2, 3, and 4 from FIG. 1, with vectors $r_{21}$, $r_{23}$, and $r_{26}$, where "21" denotes the vector between points 2 and 1, "23" denotes the vector between points 2 and 3, and "26" denotes the vector between points 2 and 6. The shape of a tetrahedron can be determined from any two internal solid angles, where the solid angle $\Omega$ is the angle formed between planes having a common origin. The tetrahedron may also be called an object cluster because it is defined from a cluster of objects on a sensor image.

In a tetrahedron, a pair of vectors with a common origin forms a plane. For example, the vector $r_{jk}$ is the unit vector from point k to point j, and vector $r_{jm}$ is the unit vector from point m to point j. The point j is a common origin for the vectors, and plane $n_{jkm} = r_{jk} \times r_{jm}$ can be determined from the vectors. An "inward" direction is defined for the three faces bounding an element of a solid angle, by multiplying any face $n_{jkm}$ by the inner product $n_{jkm} \cdot r_{jn}$, where $r_{jn}$ is the third difference vector defining $\Omega$ and $r_{jn}$ is its norm. Notationally, if this inner product is negative then $n_{jkm} \rightarrow n_{jmk}$ results in all inward-pointing normals. The same normal also has various representations, i.e., $n_{jkm} = n_{mjk} = n_{kjm} = -n_{jmk}$. The three dihedral angles are defined by:

$$\phi_{jb,ac} = \cos^{-1}(n_{jab} \cdot n_{jbc})$$

Where the first subscripted indices jb of the dihedral angle is the vertex of the planes, and the latter two indicate remaining points in the places. The solid angle is:

$$\Omega_{jkmn} = \phi_{jk,mn} + \phi_{jm,nk} + \phi_{jn,km} - \pi$$

A fourth dihedral defines the shape of the volume, for example an additional plane can be found for $r_{km}$ and $r_{kn}$ that has normal $n_{kmn}$. This defines the shape, but not the size, of the volume through any one of the three remaining dihedrals, for example the four dihedral angles $[\phi_{jk,mn}, \phi_{jm,nk}, \phi_{jn,km}, \phi_{km,jn}]$.

The cross produce $n_{jkm}$ is in the form of the sine of the internal angle $\alpha_{j,km}$ hence each dihedral angle $\phi_{jb,ac}$ is dependent upon two internal angles $\alpha_{j,ab}$ and $\alpha_{j,bc}$. An adjacent dihedral angle, for instance $\phi_{ja,bc}$, incorporates only one additional internal angle, in this case $\alpha_{j,ac}$.

As a result of the foregoing, a plurality of five internal angles with accompanying chirality checks (to avoid mirror images) are sufficient to define the shape of the tetrahedron, and the correlation of five such angles with corresponding chirality is sufficient to correlate the tetrahedron. Each of the five internal angles may be determined from the outer product:

$$\alpha_{j,km} = \sin^{-1}(r_{jk} \times r_{jm}) \qquad (1)$$

Chirality checks may be performed to avoid mirror images that give rise to pseudo-correlations by using the outer product rather than the inner product to determine the internal angle. For example in the first sensor image of FIG. 4, calculated angle $\alpha_{2,13}$ may be correlated to an angle $\beta_{a,bc}$ in a second sensor image (where a, b, and c are points in the second sensor image) and the outer products stored. A fourth point, point 6, is selected in the first sensor image with $T1 = \text{sgn}(r_{jk} \times r_{jm}) \cdot r_{26}$ also positive. When a fourth point is selected from the second sensor image for correlation evaluation, T2 may be calculated and compared. If $T2 = -T1$, then the assignments of points b and c in image 2 may be reversed and the evaluation continued. Judicious selection of points may reduce or eliminate the number of chirality checks.

As will be understood, while the calculations performed in relation to FIG. 4 are shown in terms of position vectors and assessing the correlation of clusters in terms of the position of objects within the cluster, similar calculations may be performed using different vectors in different spaces. For example, velocity vectors for each of the objects in the cluster may be considered in velocity-acceleration space. In velocity acceleration space the velocity vectors appear as a point in velocity coordinates, so clusters may be represented by their velocity in this space and calculations similar to those performed in relation to FIG. 4 may be performed to correlate the clusters.

Figure 5:
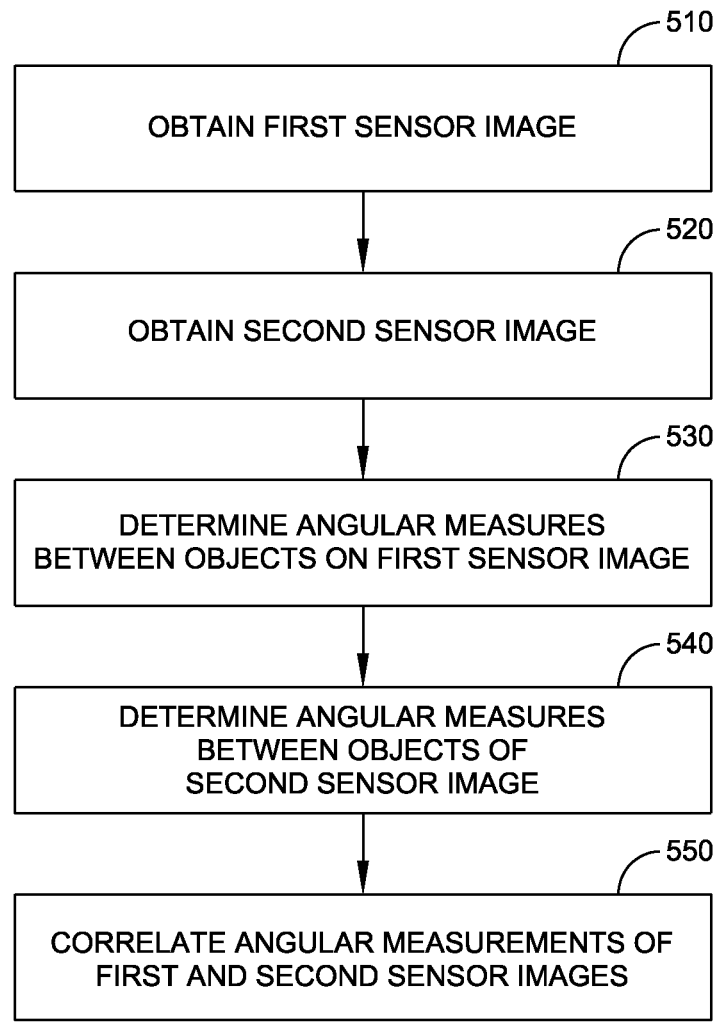
FIG. 5 is a flowchart illustrating blocks for tracking clusters.

The flowchart of FIG. 5 shows an embodiment of a method or process for tracking object clusters that involves correlating tetrahedrons in a first sensor image and a second sensor image. First, in block 510, a first sensor image in obtained. This image may be obtained by a local sensor or a remote sensor and has a plurality of objects (the plurality of first sensor image objects). In block 520, a second sensor image is obtained. It too may be obtained by a local sensor or a remote sensor and has a plurality of objects (the plurality of second sensor image objects). In block 530, angular measurements (first sensor image angular measurements) for each tetrahedron (first sensor image tetrahedrons) formed by four points (objects) in the first sensor image (first sensor image tetrahedron) are determined. As described in relation to FIG. 4, the angles formed in a tetrahedron can be determined by formula (1) above. Then at block 540, angular measurements of tetrahedrons of the second sensor image (second sensor image tetrahedrons) are determined. Finally, in block 550, angular measurements in the first sensor image (the first sensor image angular measurements) are compared to angular measurements in the second sensor image (second sensor image angular measurements). In an embodiment, this is performed by comparing the angular measurements in the first sensor image to angular measurements in the second sensor image. If certain angular measurements are identical in both, that may indicate that the objects/points that form a tetrahedron in the first sensor image are also present in the second sensor image.

Figure 6:
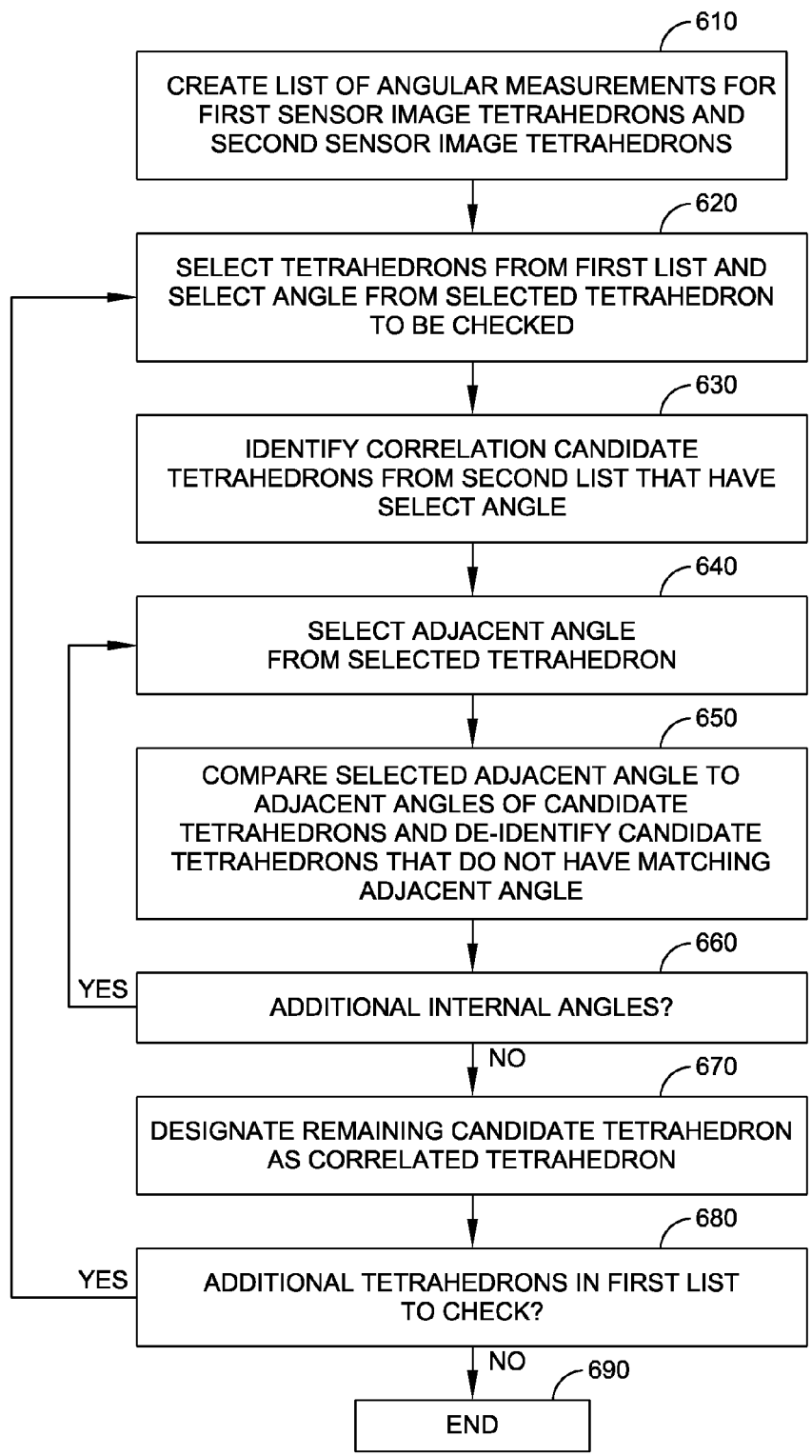
FIG. 6 is a flowchart illustrating blocks for correlating clusters.

The flowchart of FIG. 6 shows an embodiment of a detailed method or process for comparing the angular measurements between a first and second sensor image to determine if any of the objects in the first and second image are the same objects. The embodiment of FIG. 6 uses a first list L1 of the unique angular measurements for the tetrahedrons of the first sensor image and a second list L2 of the unique angular measurements for the tetrahedrons of the second sensor image to perform the process. The details of determining the angular measurements is described in detail above in relation to FIG. 4.

In block 610, a first list L1 of the angular measurements for the unique tetrahedrons of the first sensor image is created, which has first sensor image tetrahedron angular measurements. A second list L2 of the angular measurements for the unique tetrahedrons of the second sensor image is created, which has the second sensor image tetrahedron angular measurements. In an embodiment, the first and second lists include an entry for each unique tetrahedron that is definable within the sensor image. For example, the tetrahedron formed by 4-point cluster (1, 2, 3, 4) is the same as the tetrahedron formed by the 4-point cluster (4, 3, 2, 1), so that would only be counted as one unique angle on the list. Each entry also includes the five internal tetrahedron angles that are specific to each tetrahedron. Accordingly, the entries in the first list L1 include five first sensor image tetrahedron internal angles for each entry while the entries in the second list L2 include five second sensor image tetrahedron internal angles for each entry.

After the lists are created, in block 620 the first tetrahedron in list L1 is selected (selected first sensor image tetrahedron) and one of the angles in that tetrahedron is selected for comparison (selected first sensor image tetrahedron angular measurement). In block 630, the selected angle is compared to the angles of the tetrahedrons in list L2, and "candidate" tetrahedrons in list L2 (second sensor image candidate tetrahedrons) are identified as those tetrahedrons that have an angle (second sensor image tetrahedron angular measurement) matching the selected first sensor image tetrahedron angular measurement. In block 640, an adjacent angle of the selected tetrahedron from list L1 is selected (selected first sensor image tetrahedron adjacent angular measurements). The selected adjacent angle is then compared to adjacent angles of the candidate tetrahedrons (second sensor image tetrahedron adjacent angular measurements) in block 650. The candidate tetrahedrons that have a matching adjacent angle remain candidate tetrahedrons, while those tetrahedrons without a matching adjacent angle are "de-identified" as a candidate. At block 660, a a determination is made as to whether there are additional internal angles to process. If there are, the process of comparing adjacent angles is continued at blocks 640-660 until all of the adjacent angles are considered. After all of the adjacent angles have been considered, any remaining "candidate" tetrahedrons in list L2 are designated or identified as "correlated" tetrahedrons at block 670. That is, remaining second sensor image candidate tetrahedrons will have angles that match (matching angles or matching angular measurements) the angles of the first tetrahedron. Ideally, a single candidate would result, but there may be smaller clusters that also correlate. Correlated tetrahedrons may also be identified as a correlated object clusters because a tetrahedron is one form of an object cluster. At block 680 a determination is made as to whether there are additional tetrahedrons in the first list to check and if so, the process continues and blocks 620-670 are repeated until there are no additional tetrahedrons in the first list to check. The process ends at block 690 if there are no additional tetrahedrons in the first list to check.

As will be understood by those skilled in the art, the angle measures of the tetrahedrons will have associated uncertainties and corresponding correlations will have associated probabilities. For simplicity, these uncertainties and probabilities are not shown. As is known in the art, these uncertainties and probabilities may be accounted for in the calculations, and other information may be available for each point to help discern the correct correlations.

Although the process of FIG. 6 is shown in terms of lists, the correlation of tetrahedrons in the first image to tetrahedrons in the second image may be performed by other methods without lists.

The disclosed method described herein may be automated by, for example, tangibly embodying a program of instructions upon a computer readable storage media capable of being read by machine capable of executing the instructions. A general purpose computer is one example of such a machine, as are other known computing devices having processors, memory, hardware, software, and/or firmware. A non-limiting exemplary list of appropriate storage media well known in the art would include such devices as a readable or writeable CD, flash memory chips (e.g., thumb drives), various magnetic storage media, and the like.

The features of the method have been disclosed, and further variations will be apparent to persons skilled in the art. All such variations are considered to be within the scope of the appended claims. Reference should be made to the appended claims, rather than the foregoing specification, as indicating the true scope of the disclosed method.

The functions and process blocks herein may be performed automatically or wholly or partially in response to user command. An activity (including a step) performed automatically is performed in response to executable instruction or device operation without user direct initiation of the activity.

The systems and processes of FIGS. 1-6 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The processes and applications may, in alternative embodiments, be located on one or more (e.g., distributed) processing devices accessing a network linking the elements of FIG. 1. Further, any of the functions and blocks provided in FIGS. 5 and 6 may be implemented in hardware, software or a combination of both and may reside on one or more processing devices located at any location of a network linking the elements of FIG. 1 or another linked network, including the Internet.

Furthermore, although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for tracking object clusters, the method comprising:
    obtaining a first sensor image having a plurality of first sensor image objects;
    obtaining a second sensor image having a plurality of second sensor image objects;
    determining, by a computer processor, first sensor image tetrahedron angular measurements for the plurality of first sensor image objects;
    determining, by the computer processor, second sensor image tetrahedron angular measurements for the plurality of second sensor image objects;
    identifying, by the computer processor, correlated object clusters by comparing the first sensor image tetrahedron angular measurements to the second sensor image tetrahedron angular measurements.

2. The method of claim 1, wherein determining first sensor image tetrahedron angular measurements comprises determining a plurality of first sensor image tetrahedron internal angles for each first sensor image tetrahedron and wherein determining second sensor image tetrahedron angular measurements comprises determining a plurality of second sensor image tetrahedron internal angles for each second sensor image tetrahedron.

3. The method of claim 2, wherein determining the plurality of first sensor image tetrahedron internal angles comprises determining five first sensor image tetrahedron internal angles and wherein determining the plurality of second sensor image tetrahedron internal angles comprises determining five second sensor image tetrahedron internal angles.

4. The method of claim 2, further comprising performing a chirality check when determining the plurality of first sensor image tetrahedron internal angles and the plurality of second sensor image tetrahedron internal angles.

5. The method of claim 3, further comprising creating a first list containing the first sensor image tetrahedron angular measurements for first sensor image tetrahedrons.

6. The method of claim 5, further comprising creating a second list containing second sensor image tetrahedron angular measurements for the second sensor image tetrahedrons.

7. The method of claim 6, wherein comparing the first sensor image angular measurements to the second sensor image angular measurements comprises comparing the first sensor image tetrahedron angular measurements in the first list to the second sensor image tetrahedron angular measurements in the second list.

8. The method of claim 7, wherein the first sensor image tetrahedrons and the second sensor image tetrahedrons having matching first sensor image tetrahedron angular measurements and second sensor image tetrahedron angular measurements are identified as correlated object clusters.

9. The method of claim 7, wherein comparing first sensor image tetrahedron angular measurements in the first list to second sensor image tetrahedron angular measurements in the second list comprises:

selecting a selected first sensor image tetrahedron from the first list and selecting a selected first sensor image tetrahedron angular measurement of the selected first sensor image tetrahedron;

comparing the selected first sensor image tetrahedron angular measurement to the second sensor image angular measurements in the second list;

identifying second sensor image candidate tetrahedrons in the second list having a second sensor image tetrahedron angular measurement that matches the selected first sensor image tetrahedron angular measurement;

selecting selected first sensor image tetrahedron adjacent angular measurements;

comparing selected first sensor image tetrahedron adjacent angular measurements to the second sensor image angular measurements of the second sensor image candidate tetrahedrons; and designating second sensor image candidate tetrahedrons having second sensor image angular measurements matching the selected first sensor image tetrahedron adjacent angular measurements as correlated object clusters.

10. A method for tracking object clusters, the method comprising:

obtaining a first sensor image having a plurality of first sensor image objects;

obtaining a second sensor image having a plurality of second sensor image objects;

determining, by a computer processor, a plurality of first sensor image tetrahedron internal angular measurements for first sensor image tetrahedrons;

determining, by the computer processor, a plurality of second sensor image tetrahedron internal angular measurements for second sensor image tetrahedrons;

performing, by the computer processor, a chirality check when determining the plurality of first sensor image tetrahedron internal angles and the plurality of second sensor image tetrahedron internal angles; and identifying, by the computer processor, correlated object clusters by comparing the plurality of first sensor image tetrahedron angular measurements to the plurality of second sensor image tetrahedron angular measurements.

11. The method of claim 10, wherein determining the plurality of first sensor image tetrahedron internal angles comprises determining five first sensor image tetrahedron internal angles and wherein determining the plurality of second sensor image tetrahedron internal angles comprises determining five second sensor image tetrahedron internal angles.

12. A method for tracking object clusters, the method comprising:

obtaining a first sensor image having a plurality of first sensor image objects;

obtaining a second sensor image having a plurality of second sensor image objects;

determining, by a computer processor, first sensor image tetrahedron angular measurements for first sensor image tetrahedrons;

determining, by the computer processor, second sensor image tetrahedron angular measurements for second sensor image tetrahedrons; and identifying, by the computer processor, correlated object clusters by comparing the first sensor image tetrahedron angular measurements to the second sensor image tetrahedron angular measurements;

wherein comparing the first sensor image tetrahedron angular measurements to the second sensor image tetrahedron angular measurements comprises:

selecting a selected first sensor image tetrahedron and selecting a selected first sensor image tetrahedron angular measurement of the selected first sensor image tetrahedron;

comparing the selected first sensor image tetrahedron angular measurement to the second sensor image tetrahedron angular measurements;

identifying second sensor image candidate tetrahedrons having a second sensor image tetrahedron angular measurement that matches the selected first sensor image tetrahedron angular measurement;

comparing selected first sensor image tetrahedron adjacent angular measurements to the second sensor image tetrahedron angular measurements of the second sensor image candidate tetrahedrons; and designating second sensor image candidate tetrahedrons having second sensor image tetrahedron angular measurements matching the selected first sensor image tetrahedron adjacent angular measurements as correlated object clusters.

13. A sensor system for tracking object clusters comprising:

a command and decision unit processor;

a memory, coupled to the command and decision unit processor, storing program instructions which, when executed by the command and decision unit processor, cause the command and decision unit processor to:

obtain a first sensor image having a plurality of first sensor image objects;

obtain a second sensor image having a plurality of second sensor image objects;

determine first sensor image tetrahedron angular measurements for first sensor image tetrahedrons defined by the plurality of first sensor image objects;

determine second sensor image tetrahedron angular measurements for second sensor image tetrahedrons; and identify correlated object clusters by comparing the first sensor image tetrahedron angular measurements to the second sensor image tetrahedron angular measurements.

14. The sensor system of claim 13, further comprising a communications unit, and wherein the memory storing program instructions which cause the command and decision unit processor to obtain the second sensor image comprises the memory storing program instructions which cause the command and decision unit processor to receive the second sensor image from the communications unit.

15. The sensor system of claim 13, wherein the memory stores further program instructions which cause the command and decision unit processor to:

create a first list containing the first sensor image tetrahedron angular measurements for first sensor image tetrahedrons; and create a second list containing second sensor image tetrahedron angular measurements for the second sensor image tetrahedrons;

wherein the memory storing program instructions which cause the command and decision unit processor to identify correlated object clusters comprises the memory storing program instructions which cause the command and decision unit processor to identify correlated object clusters by comparing the first sensor image tetrahedron angular measurements in the first list to the second sensor image tetrahedron angular measurements in the second list.

16. The sensor system of claim 13, wherein the memory stores further program instructions which cause the command and decision unit processor to perform a chirality check when determining the plurality of first sensor image tetrahedron internal angles and the plurality of second sensor image tetrahedron internal angles.

17. The sensor system of claim 13, wherein the memory storing program instructions which cause the command and decision unit processor to identify correlated object clusters by comparing the first sensor image tetrahedron angular measurements to the second sensor image tetrahedron angular measurements comprises the memory storing program instructions which cause the command and decision unit processor to:

select a selected first sensor image tetrahedron and selecting a selected first sensor image tetrahedron angular measurement of the selected first sensor image tetrahedron;

compare the selected first sensor image tetrahedron angular measurement to the second sensor image tetrahedron angular measurements;

identify second sensor image candidate tetrahedrons having a second sensor image tetrahedron angular measurement that matches the selected first sensor image tetrahedron angular measurement;

compare selected first sensor image tetrahedron adjacent angular measurements to the second sensor image tetrahedron angular measurements of the second sensor image candidate tetrahedrons; and designate second sensor image candidate tetrahedrons having second sensor image tetrahedron angular measurements matching the selected first sensor image tetrahedron adjacent angular measurements as correlated object clusters.

* * * * *